INVENTORS
PHILIP M. FOLGER
CHARLES M. WHEELER
BY Vernon N. Kalb
ATTORNEY

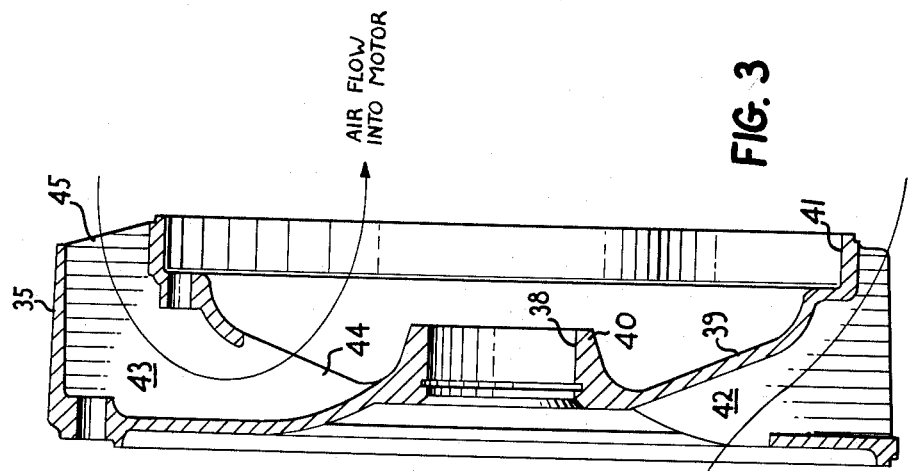
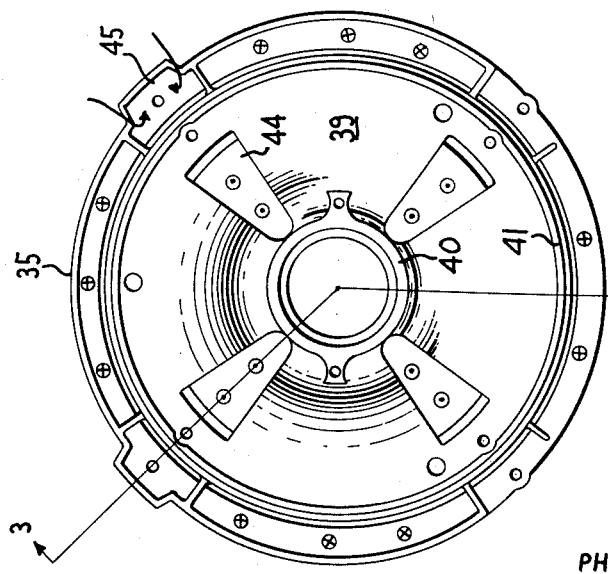

Feb. 6, 1962 C. M. WHEELER ET AL 3,020,427
VENTILATION OF DYNAMOELECTRIC MACHINE DRIVE UNITS
Filed March 14, 1960 3 Sheets-Sheet 3

INVENTORS
PHILIP M. FOLGER
CHARLES M. WHEELER
BY Vernon H. Kalb
ATTORNEY

3,020,427
VENTILATION OF DYNAMOELECTRIC MACHINE DRIVE UNITS

Charles M. Wheeler and Philip M. Folger, Erie, Pa., assignors to General Electric Company, a corporation of New York
Filed Mar. 14, 1960, Ser. No. 14,817
7 Claims. (Cl. 310—59)

The present invention relates to the construction and ventilation of dynamoelectric machines, and more particularly to a construction of cooperatively mounted dynamoelectric machines which provides isolated double-ended ventilation for each machine.

The present invention is specially adaptable for incorporation in motor generator sets and motor driven eddy current couplings. Although this invention is adaptable for use in either of the above-mentioned combinations, or in any other application where two or more dynamoelectric machines are commonly or cooperatively housed, the shaft of one machine driving a shaft of a second machine, the invention is particularly described as incorporated in an electrical drive unit comprising a driving motor of the induction type and an eddy current coupling.

An eddy current coupling is an electromagnetic device that is used to obtain adjustable speed from a constant or variable speed source. Operation is based on the principle that current induced in a conductor loop by a rotating field reacts with the field to produce a torque in the direction of rotation. A solid drum such as an eddy current drum is in effect a number of such conductor loops and acts as a magnetic flux carrier as well as an eddy current conductor. Torque can be produced only when there is relative motion or slip between a rotating field member and the drum, and the torque transmitted between the drum and the rotating field increases with field strength and slip speed. The rotating field member is secured to an output shaft and the torque transmitted thereto utilized to drive a load device. The difference between power input from the motor and power output from the output shaft of the eddy current coupling is absorbed by the coupling and appears as heating of the eddy current drum plus some windage and friction losses. These losses must be removed by a cooling medium to permit continuous operation. Furthermore, the greater the slip, the greater are the heat losses, and therefore the heat dissipating and cooling requirements.

From the foregoing discussion, it may be seen that the speed range available with a given eddy current coupling is limited by the heat dissipating capacity of the coupling. For example, at constant load torque the losses are directly proportional to the slip speed and therefore controlling of the limits of the speed range.

Moreover, in electrical drive units of the type described, there will be much more heat generated in the coupling than in the drive motor, requiring proportionately more cooling air flow through the coupling than the motor to remove the heat generated.

Efficient dissipation of heat generated within any dynamoelectric machine including eddy current couplings, is of serious concern to all designers of dynamoelectric machines, and it is well recognized that where heat generated by the machine may be efficiently removed, the machine size may be reduced for a given machine rating, or in the alternative, the output rating of a given size machine may be increased without increasing the machine size. In the case of an eddy current coupling, if the rate of heat dissipation from the eddy current drum may be increased, the lower continuous rated speed may be decreased and other operating characteristics may be improved.

Therefore, it may be seen that the provision of more efficient ventilation gives the dynamoelectric machine designer more freedom of design.

Many structures have been proposed in the past for electrical drive units of the types mentioned above, wherein separate air paths are provided for each machine and the ventilating air flow through one machine does not pass through the second machine.

In these prior art arrangements, ventilating air flow may be introduced at the outboard ends of each machine and exhausted at the common connection between the machines. There have also been structures where ventilating air has been taken into the common connection between the two machines, thereafter divided into air flow paths through each of the machines and exhausted at the outboard ends of the machine housings. These arrangements require the air flow through each machine to travel substantially the entire length of each machine and in the second arrangement described, the fan of one machine may "rob" air from the second machine.

While these ventilating arrangements have proved satisfactory when the size, machine ratings, machine efficiency and heat losses of each machine are considered in the design of such machines, these arrangements require large machine housings in order that sufficient ventilating air flow may be passed over the heat generating parts of each machine and yet remove heat near the termination of the air flow paths.

In view of these heat dissipating limitations and considerations in electrical drive units, it is a primary object of this invention to provide an improved ventilating arrangement and heat dissipation capacity for any plural machine electric drive unit.

It is a further object of this invention to provide a ventilation arrangement for electric drive units which allows an increase in the output ratings of a given machine, or in the alternative, a decrease in the size of an electric drive unit without decreasing the ratings thereof.

These and other objects of my invention are achieved in one form thereof by providing in an electric drive unit comprising a motor and eddy current coupling having air intake vents in the outboard ends of the housings and air exhaust vents intermediate the ends of each housing, a housing adapter connecting the housing of each machine and having baffling means therein providing separate air intake and directing paths into each machine. Fan members mounted in each machine draw ventilating air into each machine from both ends of each housing and exhaust the air through the vents intermediate the ends of the housing. With this construction, each machine is ventilated at each end and ventilating air flow for each machine travels only a portion of the length of each machine, and the air flow through one machine is isolated from the other machine.

The features of the invention which are believed to be novel are set forth with particularity in the appended claims. The invention itself, however, both as to its organization and method of operation, together with further advantages and objects thereof, can best be understood by referring to the following description when taken in connection with the following drawings wherein:

FIGURE 2 is illustrative of a housing adapter utilized in practice of the invention in one form thereof;

FIGURE 3 is a view along section 3—3 of FIG. 2; and

Figure 1:
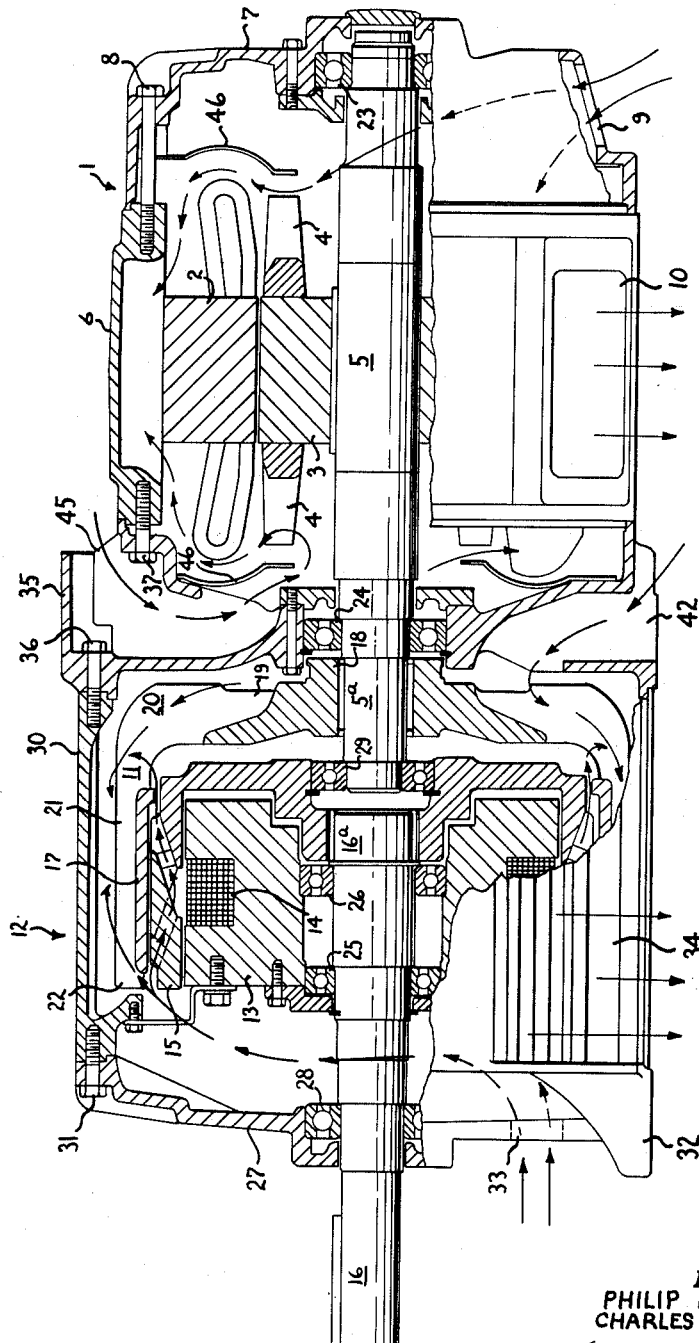
FIGURE 1 is a cutaway view of an electric drive unit comprising an induction type motor and eddy current coupling incorporating the invention.
Figure 4:
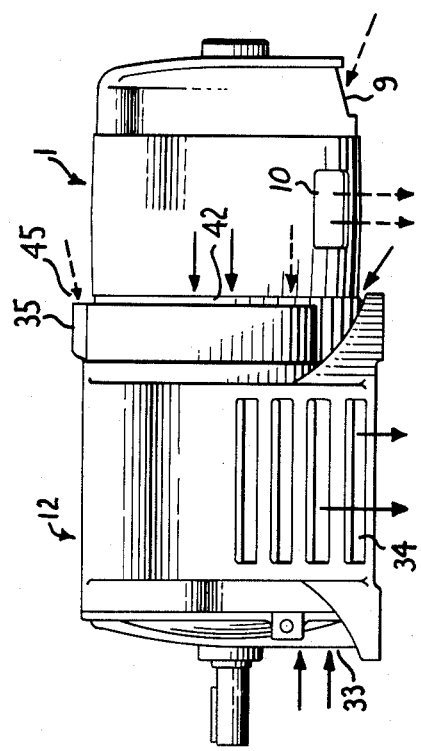

FIGURES 4 and 4ª are outline views of the electric drive unit of FIG. 1.

Reference is now made to the figures wherein like identifying numerals identify like parts. Specifically referring to FIG. 1, we show an induction motor 1 having a stator 2 and a rotor 3 with fan blades 4 mounted thereon and arranged to rotate with the motor shaft 5. The motor has an annular housing member 6 supporting the stator 2, and end housing member 7 is secured to the outboard end of member 6 by means of bolts 8. The end member 7 has a ventilating air intake vent 9 therein. For purposes of illustration and description, we show the intake vent 9 located near the bottom of the end housing member 7. However, it is to be understood that intake vents such as 9 may be defined in any portion of the end member 7. The annular housing member 6 has exhaust ports 10 therein intermediate the ends thereof. Electrical energy is furnished the stator circuits of the motor from a source of alternating current energy, not shown.

The motor shaft 5 drives the eddy current drum assembly 11 of eddy current coupling 12, the drum 11 being secured to motor shaft 5 at shaft portion 5a. The eddy current coupling 12 comprises generally, the eddy current drum 11, driven by motor shaft 5, a stationary field core 13 having an exciting coil 14 mounted on the core 13, and a rotating interdigitated pole field assembly 15 secured to the output shaft 16 at shaft portion 16a. A load, not shown, may be connected to the output shaft 16 to be driven thereby. The coil 14 may be excited from control means, not shown.

The interdigitated pole field assembly 15 is preferably of the type disclosed and claimed in the copending application of Adam N. Farrell, Serial No. 9,534, filed February 18, 1960 and assigned to the same assigneee as the present application.

The eddy current drum assembly 11 comprises a cylindrical portion 17 co-axial with the core 13 and rotating field 15, and a hub portion 18 secured to the motor shaft 5 at shaft portion 5a. The cylindrical portion 17 is attached to hub portion 18 by means of vanes 19 extending radially from the hub portion 18. The vanes 19 are so formed as to have fan portions 20 thereon. The vanes 19 further extend into cooling fins 21 on the cylindrical portion 17 to provide an increased heat dissipating surface. These fin portions overhang the cylindrical portion 17 to provide air-directing fan blade members 22.

The motor shaft 5 is supported in bearing assemblies 23 and 24. The core 13 is supported on bearing assemblies 25 and 26 on output shaft 16 which in turn is supported in end housing member 27 by bearing assembly 28 and from the motor shaft 5 by pilot bearing assembly 29. The bearing support arrangement illustrated is disclosed and claimed in our copending application, Serial No. 822,947, filed June 25, 1959 and assigned to the same assignee as the present application.

The end housing member 27 is secured to the generally annular housing member 30 as by bolts 31. The housing member 30 has feet 32 thereon which may be bolted or otherwise secured to a suitable support member. The end plate member 27 has one or more air intake vents 33 therein to allow the introduction of ventilating air flow into the coupling. Exhaust ports 34 are provided in the housing member 30 intermediate the ends thereof. The intake vents 33 may be located on the end housing member 27 other than at the location illustrated, and it will be understood that the exhaust ports 34 are located on either side of the machine, or in the alternative, exhaust ports may be spaced around the periphery of the housing 30. The motor housing 6 also has exhaust ports 10 on either side thereof, but not limited to that location.

The motor 1 is supported, aligned and properly spaced from the eddy current coupling by means of a housing adapter 35 which is secured to housing member 30 of the coupling by means of bolts 36 and to the housing member 6 of the motor 1 by means of bolts 37. It may be seen that the housing adapter 35 provides a bearing seat 38 for bearing assembly 24 which aligns and journals motor shaft 5.

The adapter 35, which is shown in more detail in FIGS. 2 and 3, is constructed to have baffling means which define separate air intake and directing passages into the coupling housing and the motor housing. FIG. 2 illustrates a housing adapter constructed in accordance with the invention viewed from the motor side, and FIG. 3 is a view taken along section 3—3 of FIG. 2. A baffling member 39 extends from the hub 40 of the adapter rim 41 to form air intake and directing passages 42 into the coupling. This arrangement provides paths for ventilating air flow into the coupling, isolated from the motor. The baffling member 39 has pockets 43 formed thereon which have openings 45 communicating with the external atmosphere and opening 44 communicating with the interior of the motor 1.

Ventilating air is drawn into the motor through pocket 43 of the adapter 35 and intake vent 9 upon rotation of the fan members 4 on the motor rotor. The air is then exhausted through exhaust ports 10 after following the air flow paths shown by the arrows within the motor 1. The generally annular baffling members 46 direct air flow over the rotor and stator surfaces. It may be seen that this ventilating arrangement provides double-ended ventilation of the motor and the ventilating air flow into the motor 1 is isolated from and indepedent of the air flow into the coupling 12.

Ventilating air flow is introduced into the eddy current coupling 12 by means of air intake vents 33 in the end housing member 27 which is drawn into the coupling upon rotation of the fan members 22 and air flow through the adapter 35 which is drawn in through air passages 42 defined by baffling member 39, by the fan portions 20 on the vanes 19 of the eddy current drum assembly 11. This air flow is exhausted through the exhaust vents 34 in the housing 30 of the eddy current coupling 12. The air flow paths through the coupling are shown by the arrows in FIG. 1. It may be seen that the coupling is ventilated from both ends of its housing 30 and the air flow through the coupling 12 is isolated from and independent of the air flow into the motor 1.

Although ventilating air flows through the motor and eddy current coupling is illustrated as being generally in one plane, it will be realized that the fan members 20 and 22 of the drum assembly 11 direct ventilating air flow over the surfaces of the cylindrical portion 15 of the eddy current drum assembly 11 and the fins 21 and the direction of ventilating air flow will be circumferential as well as axial.

In the motor, air flow is directed over the rotor and stator surfaces upon rotation of the fan members 4 mounted on the rotor 3. In the motor structure, illustrated, baffling means 46 are provided to direct ventilating air flow over the rotor and stator assemblies after the air has been drawn into the motor by the fan members 4 through adapter pockets 43 and the outboard end air intake vent 9. The direction of ventilating air flow through the motor, while illustrated generally as being in one plane, is also directed circumferentially around the inside of housing member 6 before being exhausted through exhaust vents 10.

Upon operation of the electric drive unit illustrated, the fan members associated with the motor and eddy current couplings are rotated and cause air to flow into the outboard ends of each housing, and also into each housing through the separate air-directing passages defined by the baffling means of and pockets in the adapter. The directions of air flow are as shown on the drawings. In FIG. 2, the circles having "X" marks therein, indicate air flow into the coupling, and the circles having dots therein indicate air flow into the motor.

Figure 4A:
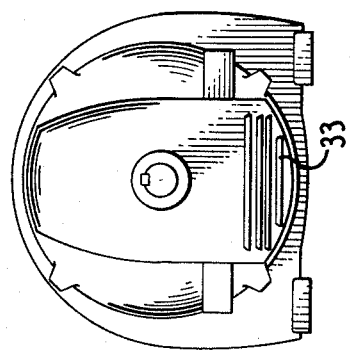

Reference is now made to FIGS. 4 and 4a which show elevation and end views of a drive unit incorporating our invention. The solid arrows represent air flow into and out of the eddy current coupling housing, and the dashed arrows represent air flow into and out of the motor housing.

It is readily seen that the arrangement which we have described provides indpendent double-ended ventilation of each machine, isolating the ventilating air flow of one machine from the other. It is well known to those skilled in the art that double-ended ventilation of air-cooled dynamoelectric machines is the most efficient type of air cooling.

Inasmuch as each machine is separately ventilated from each end, more efficient heat dissipation is provided, especially for the driven machine, in this case the eddy current coupling 12. This provision allows utilization of either of two advantageous design considerations. For a given machine size, the output rating of the driven machine may be increased inasmuch as more heat losses may be dissipated and the machine will run cooler, or in the alternative, a machine may be designed for a given output and reduced size. The choice of which advantage will be utilized is of course determined by the designer, and will be based upon the appliaction of the machine and the specifications of the user.

Where the driven machine is an eddy current coupling, the present invention yields another advantage. The heat dissipating capacity of the drum is proportional to the surface area of the drum and with more efficient ventilation of the surfaces of the drum, its size may be reduced which decreases its inertia and allows more rapid acceleration.

The housing adapter 35, besides allowing independent double-ended ventilation of each machine of electric drive units of the types described and mentioned, also provides a means of mounting one machine upon the other to be supported thereby and aids in aligning the shafts of the two machines. In the illustrated electric drive, the feet 32 of the housing 30 of the eddy current coupling 12 are secured to a suitable base and the motor is supported from the eddy current coupling housing 30.

Although we have shown the motor housing as having a smaller diameter than the housing of the eddy current coupling, it is contemplated that in other electric drives in which our invention is incorporated, a driving machine may have a larger diameter or the same diameter as the driven machine. In such cases, a housing adapter may be designed for the particular installation. Furthermore, the relative volumes of air flow passing through the separate and isolated air intake and directing passages may be varied to fit the particular installation and ventilation requirements of the machine. The relative sizes and numbers of the respective air intake and directing passages will be determined by the relative heat dissipating requirements of the machines of the drive unit.

In the electric drive unit in which our invention is illustrated as incorporated, the air-directing passages for the eddy current coupling are made larger than those for the driving motor, inasmuch as more heat must be dissipated in the coupling.

Where the housings of the driving and driven machine are of the same diameter, a shielding member should be provided over the intake openings of the adapter air intake passages to shield against moisture. In such an arrangement the shield wound be spaced a predetermined dimension above the openings so as not to interfere with air flow into the passages.

While we have illustrated and described our invention as incorporated in an electrical drive unit comprising a motor and eddy current coupling, it will be obvious to those skilled in the art that our invention may be incorporated in other plural unit electric drives such as motor generator sets without departing from the spirit and scope of this invention. Accordingly, it is our intention to cover all changes and modifications of this example of the invention herein chosen for purposes of disclosure which do not constitute departures from the spirit and scope of the invention.

What we claim as new and desire to secure by Letters Patent of the United States is:

1. An electric power unit comprising two dynamoelectric machines, each machine having a generally annular housing member and an end housing member at opposite ends of said drive unit, a housing adapter member positioned intermediate and interconnecting said annular housing members, said machines having aligned rotatable shafts, said adapter member having a hub portion providing bearing support means for supporting and aligning said shafts, and baffling means extending outwardly from said hub portion to a peripheral portion, said peripheral portion and said baffling means defining independent and mutually isolated air intake and directing paths into each machine, each machine having means arranged to draw air therein through its associated air intake and directing means whereby air flow into each machine through said adapter is independent of air flow through said adapter into the other machine.

2. The unit of the above claim wherein the air intake and directing paths of the adapter are proportioned in accordance with the heat-dissipating requirements of the machines.

3. An electric power unit comprising two dynamoelectric machines, each machine having a generally annular housing member extending substantially the length of the machine and an end housing member at opposite ends of said drive unit, each of said end housing members having an air intake vent therein, said housing having air exhaust vents defined therein intermediate the ends thereof, a housing adapter member positioned intermediate said housing members and supporting one upon the other, said machines having aligned rotatable shafts, said adapter member having a hub portion providing bearing support means for supporting and aligning said shafts and baffling means extending outwardly from said hub portion to a peripheral portion, said peripheral portion and said baffling means defining independent and mutually isolated air intake and directing paths into each machine, each machine having means arranged to draw air therein through its associated adapter air intake and directing means and end housing member vents and exhaust air through its associated housing exhaust vent whereby air flow into each machine through said adapter is independent of air flow through said adapter into the other machine and each machine is ventilated from each of its ends.

4. In an electric drive unit comprising an electric motor and an eddy current coupling, said motor having a shaft with a rotor thereon, said eddy current coupling having a rotatable field member arranged to drive an output shaft, and an eddy current drum concentric with said field member and arranged to be driven by said motor shaft, said motor and said coupling having housings; a housing adapter positioned intermediate and connecting said housings and having a hub portion supporting and aligning said shafts, baffling means extending outwardly from said hub portion to a peripheral portion, said peripheral portion and said baffling means defining independent and mutually isolated air-directing paths into the motor and the coupling, and means associated with each of the motor and the coupling for drawing air into the motor and the coupling through the associated adapter air-directing paths whereby air flow into each the motor and the coupling through said adapter is independent of air flow into the other through said adapter.

5. In an electric drive unit comprising an electric motor and an eddy current coupling, said motor having a shaft with a rotor thereon, said eddy current coupling having a rotatable field member arranged to drive an output shaft, and an eddy current drum concentric with said field member and arranged to be driven by said motor shaft, said motor and said coupling having housings; a housing adapter positioned intermediate and connecting said housing, said adapter having a hub portion supporting and journaling one end of the motor shaft, air intake vents defined in the outboard ends of each of said housings, said adapter having baffling means extending from said hub portion to a peripheral portion, said peripheral portion and said baffling means defining separate air-directing paths into the motor and the coupling, and means associated with each of the motor and the coupling for drawing air into the motor and the coupling through the associated intake vents and adapter air-directing paths and exhausting the air through the associated exhaust vents whereby both the motor and the coupling are ventilated from both ends and the ventilating air flow through the motor and through the coupling are isolated from the other.

6. An electric drive unit comprising a motor and an eddy current coupling, said motor having a rotating shaft with fan members thereon and a housing, said coupling having a rotating field assembly arranged to drive an output shaft, an eddy current drum concentric with said field assembly with air-directing means thereon and a housing, said drum being driven by said motor shaft, said housings having air intake vents at the outboard ends thereof and air exhaust vents intermediate the respective ends thereof, said coupling housing being of a larger diameter than said motor housing and having feet thereon adapted to be secured to a base, a housing adapter secured to the inboard end of said coupling housing and supporting said motor housing thereon, said adapter having a hub portion supporting and aligning said shafts, said adapter having baffling means extending outwardly from said hub portion to a peripheral portion, said peripheral portion and said baffling means defining mutually isolated air intake and directing passages into said motor and said coupling, said motor fan members upon operation of said motor being arranged to induce air flow into said motor through the motor intake vents and adapter air passages associated with said motor and exhaust the air intake through the motor exhaust vents, said coupling air-directing means being arranged to induce air flow into said coupling through the coupling intake vents and adapter air passages associated with said coupling and exhaust the air intake through the coupling exhaust vent whereby each machine is ventilated from both of its ends and ventilating air flow through each machine is isolated from the other machine.

7. An electric drive unit comprising two dynamoelectric machines having housings, the shaft of one of said machines arranged to deliver power to the second of said machines, a housing adapter positioned intermediate and connecting the housings of said machines, air intake vents in the outboard ends of each of said housings and air exhaust vents intermediate the ends of each of said housings, said adapter having baffling means defining mutually isolated air-directing paths into each machine, and means associated with each machine for drawing air into said machines through the associated intake vent and adapter baffling means and exhausting the air through the associated exhaust vents, whereby each machine is ventilated from each of its ends and the ventilating air flow through each machine is isolated from the other machine, the sizes of said air-directing passages defined in said adapter being proportioned in accordance with the relative heat dissipating requirements of the machines.

References Cited in the file of this patent

UNITED STATES PATENTS

| | | |
|---|---|---|
| 1,654,305 | Nottage | Dec. 27, 1927 |
| 1,692,371 | Froesch | Nov. 20, 1928 |
| 2,058,572 | Delaval-Crow | Oct. 27, 1936 |
| 2,454,120 | Atwell et al. | Nov. 16, 1948 |
| 2,466,007 | Denneen | Apr. 5, 1949 |
| 2,479,233 | Haas | Aug. 16, 1949 |
| 2,610,992 | Johns | Sept. 16, 1952 |
| 2,825,827 | Luenberger | Mar. 4, 1958 |
| 2,908,834 | Munson | Oct. 13, 1959 |